(12) United States Patent
Bitner et al.

(10) Patent No.: US 12,023,754 B2
(45) Date of Patent: Jul. 2, 2024

(54) METHOD FOR FOIL COATING USING A LASER

(71) Applicant: Auto-Kabel Management GmbH, Hausen i.W. (DE)

(72) Inventors: Urszula Bitner, Berlin (DE); Marie Redder, Ebnat-Kappel (CH); Kabelo Sebetlela, Berlin (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 18/255,401

(22) PCT Filed: Nov. 16, 2021

(86) PCT No.: PCT/EP2021/081761
§ 371 (c)(1),
(2) Date: Jun. 1, 2023

(87) PCT Pub. No.: WO2022/117324
PCT Pub. Date: Jun. 9, 2022

(65) Prior Publication Data
US 2023/0398628 A1     Dec. 14, 2023

(30) Foreign Application Priority Data
Dec. 2, 2020   (DE) ............... 10 2020 131 954.1

(51) Int. Cl.
*B23K 26/0622* (2014.01)
*B23K 26/00* (2014.01)
(Continued)

(52) U.S. Cl.
CPC ...... *B23K 26/0624* (2015.10); *B23K 26/0006* (2013.01); *B23K 26/34* (2013.01);
(Continued)

(58) Field of Classification Search
CPC ............ B23K 2101/36; B23K 2103/12; B23K 2103/10; B23K 26/34; B23K 26/0006; B23K 26/0624; B23K 26/38
(Continued)

(56) References Cited

U.S. PATENT DOCUMENTS

| | | | | |
|---|---|---|---|---|
| 4,769,901 A | * | 9/1988 | Nagahori | ............ H01C 1/1406 29/621 |
| 4,772,773 A | | 9/1988 | Hashimoto et al. | |

(Continued)

FOREIGN PATENT DOCUMENTS

| | | |
|---|---|---|
| DE | 102004002268 A1 | 8/2005 |
| DE | 102009047490 A1 | 6/2011 |

(Continued)

OTHER PUBLICATIONS

International Searching Authority/EP, International Search Report and Written Opinion of the International Searching Authority, Application No. PCT/EP2021/081761, dated Feb. 14, 2022, 14 pages.
(Continued)

*Primary Examiner* — Jimmy Chou
(74) *Attorney, Agent, or Firm* — Sunstein LLP (57) ABSTRACT

A method of coating metal parts, comprising providing a metal part of a first metal material, applying a foil of a second metal material to the metal material onto the metal part in a bearing area, and irradiating the foil applied on the metal part in at least part of the bearing area with a laser.

20 Claims, 8 Drawing Sheets

(51) Int. Cl.
    *B23K 26/34*     (2014.01)
    *B23K 26/38*     (2014.01)
    *B23K 101/36*     (2006.01)
    *B23K 103/10*     (2006.01)
    *B23K 103/12*     (2006.01)

(52) U.S. Cl.
    CPC .......... *B23K 26/38* (2013.01); *B23K 2101/36* (2018.08); *B23K 2103/10* (2018.08); *B23K 2103/12* (2018.08)

(58) Field of Classification Search
    USPC .................................................... 219/121.69
    See application file for complete search history.

(56) References Cited

U.S. PATENT DOCUMENTS

| | | | | |
|---|---|---|---|---|
| 5,221,426 | A * | 6/1993 | Tessier | H01L 21/32131 |
| | | | | 438/669 |
| 6,119,335 | A * | 9/2000 | Park | H05K 3/4652 |
| | | | | 29/830 |
| 6,827,250 | B2 * | 12/2004 | Uhland | A61K 9/0097 |
| | | | | 219/121.64 |
| 2001/0036587 | A1 * | 11/2001 | McCay | B21C 51/005 |
| | | | | 430/945 |
| 2004/0226923 | A1 | 11/2004 | Amorosi et al. | |
| 2010/0108666 | A1 * | 5/2010 | Gafri | B23K 20/129 |
| | | | | 219/603 |
| 2014/0273667 | A1 * | 9/2014 | Tachibana | H01R 43/02 |
| | | | | 439/877 |
| 2015/0357723 | A1 * | 12/2015 | Tachibana | C22C 9/06 |
| | | | | 29/879 |
| 2016/0001397 | A1 * | 1/2016 | Eun | B23K 26/0624 |
| | | | | 219/121.62 |
| 2016/0089719 | A1 * | 3/2016 | Lacy | C23C 28/02 |
| | | | | 219/76.12 |
| 2016/0183380 | A1 * | 6/2016 | Ishii | H05K 3/025 |
| | | | | 156/247 |
| 2016/0263703 | A1 * | 9/2016 | Eldred | B23K 26/244 |
| 2017/0250381 | A1 * | 8/2017 | Okawara | C23C 14/12 |
| 2018/0045232 | A1 | 2/2018 | Capostagno et al. | |
| 2019/0312173 | A1 * | 10/2019 | Lu | H01L 31/0516 |
| 2020/0324362 | A1 | 10/2020 | Vogli et al. | |
| 2020/0393069 | A1 * | 12/2020 | Sachdev | B23K 26/206 |

FOREIGN PATENT DOCUMENTS

| | | |
|---|---|---|
| DE | 102013208230 A1 | 11/2014 |
| EP | 1514634 A1 | 3/2005 |
| JP | 2014140890 A | 8/2014 |
| WO | 2016/087067 A1 | 6/2016 |
| WO | 2020120726 A1 | 6/2020 |

OTHER PUBLICATIONS

German Patent Office, Office Action, Application No. 10 2020 131 954.1, dated Nov. 12, 2021, 6 pages (in German).

Li Yingqi et al., "Building metallic glass structures on crystalline metal substrates by laser-foil-printing additive manufacturing," Journal of Materials Processing Technology, Elsevier, NL, vol. 248, 2017-05-26, pp. 249-261; DOI: 10.1016/J.JMATPROTEC.2017.05.032; ISSN: 0924-0136, XP085062347.

* cited by examiner

METHOD FOR FOIL COATING USING A LASER

CROSS-REFERENCE TO RELATED APPLICATIONS

This application is the national phase entry of international patent application no. PCT/EP2021/081761, filed Nov. 16, 2021 and claims the benefit of German patent application No. 10 2020 131 954.1, filed Dec. 2, 2020, the disclosures of which are incorporated herein by reference in their entirety.

TECHNICAL FIELD

The subject matter relates to a method for the selective coating of metal parts, in which a foil bearing on a metal part is welded to the latter by a laser, and to a metal part manufactured by this method.

BACKGROUND ART

In the course of the advancing electrification of mobility, increasingly high currents are transmitted via cables in motor vehicles. This places high demands on the cables themselves, but also in particular on transitions between cables and contact elements and on transitions between cables themselves.

Such transitions are usually realised by various types of connections. Common are welded connections on the one hand and screwed connections, clamped connections and/or pressed connections, hereafter generally called force connections, on the other hand. The type of connection is always adapted to the requirements of the connection, for example welded connections are well suited as permanent connections with low transition resistance. Force connections, on the other hand, can be closed at the time of assembly and also released again at a later time. Force connections, however, cannot offer the same quality of electrical contact resistance and may therefore have a higher ohmic resistance.

It is often necessary to connect one and the same component to other elements by means of different types of connections. For example, these can be components that function as connecting parts at the end of a cable, such as cable lugs. Often a welded connection on the one hand and a detachable connection, in particular a force connection, on the other hand are necessary and provided on the same component.

The respective connections place different demands on the components to be connected. In particular, they place requirements on the surface condition of the components in the area of the connection. For example, a welded joint requires in particular a clean, i.e. not contaminated, plain surface. Thus, a welding result that is as homogeneous as possible with high mechanical stability and low electrical resistance can be achieved.

Force-fit connections (force connections), on the other hand, place particularly high mechanical demands on the components to be contacted. On the one hand, they must be able to absorb pressure. The material of the components involved should therefore not be too soft in order not to deform too much during the connection. However, it is also advantageous if the surface of the contacted components in the area of the connection is relatively ductile, at least in its uppermost layer. In this way, the largest possible contact area can be achieved, since unevenness is compensated for by the surface that deforms when force is applied. In addition, there are requirements for the material combinations between the contact part and the elements to be contacted with it, which come into direct contact with each other in the area of the connection. Thus, it is advantageous to provide homogeneous connections on the contacting surfaces in order to avoid contact corrosion, especially between metals of different redox potentials.

In order to prepare the surface of a contact part for the respective type of connection, it is often coated before contacting. For this purpose, it is common to coat contact parts made of a first material completely with a second metal in a first step. This means that the contact part is essentially coated on all sides with a layer of a second material. Thus, the surface of the contact part is prepared for a particular type of connection for which the applied coating is favourable. The coating can provide a type-specific connection by matching the material of the element to be contacted. Also, the surface can adjust the mechanical properties of the surface, such as making it harder or softer than the substrate material. The coating can also adjust the chemical properties of the surface of the contact part, the redox potential, oxidisability, etc.

A coating is not only relevant for contact parts. The area where the coating is applied depends on the requirements of the metal part. For example, areas can be coated that are later exposed to particular chemical, mechanical and/or electrical stresses in the installed state. The coating can also be arranged, for example, in an area where a tool is applied during assembly or also during the creation of the connection. For example, the area where a sonotrode and/or an anvil of an ultrasonic welding device attaches can be coated. Here, for example, the abrasion of the sonotrode and/or anvil can be reduced by the use of a ductile coating.

An integral coating is relatively easy to realise. Nevertheless, a second connection is often provided on the contact part, as described above. This may place different demands on the surface. In particular, the pure starting material of the contact part, as it was achievable before coating, may be more suitable for the second connection than the coated surface. This can be the case in particular with welded joints. Often, therefore, the base material from which the contact part is mainly formed is exposed again after coating. For this purpose, coatings are often removed again locally in order to expose the material lying underneath the coating again.

Specifically, it is conceivable, for example, to coat a metal part made of a first metal material, for example copper, holistically, i.e. essentially from all sides, with a thin layer of a second metal material by means of an electroplating method. This can be a ductile metal material, for example nickel or tin. The surface is now prepared for a force connection. For a welded joint, however, the pure copper is to be welded again. In order to restore access to it, the coating is now removed locally in a second step, for example by means of an etching method, a decoating laser, mechanical ablation, etc.

The problem of the described procedure is that a removal/ablation of a coating never is perfect and the surface after the removal/ablation is not as pure as before the coating. Oftentimes, residues of the coating and/or the tool remain after the removal/ablation. Also, the surface of the material is often no longer as smooth as before the coating and removal steps. The steps are also sometimes time-consuming (etching) and do not fit easily into a production chain.

It is possible to cover the metal part locally before coating, which is then removed again after the coating step.

However, this is a costly method step that would raise the production costs too much for the market, which is characterized by cost pressure.

Therefore, the subject matter was based on the object of coating a metal part locally in a favourable manner without changing the surface of the non-coated areas.

SUMMARY OF THE INVENTION

It has been recognised that a local coating of a metal part is possible by welding a metal foil onto the metal part with a laser.

First, a metal part is provided for this purpose. The metal part can be formed from a solid material, in particular from a single metal material such as copper or copper alloys or aluminium or aluminium alloys. It is also possible that the metal part is formed from several different metal materials, in particular two different metal materials. It is also possible that the metal part is not formed from a solid material, but has cavities. Also, the metal part may be formed only partially from a metal and partially from another material, such as a non-conductor. For example, a non-conductor may act as a carrier material and the metal material may act as a conductive contact material.

The metal part may be cast, stamped from a sheet, cut out, milled, forged or the like. Its shape is preferably substantially cuboidal, at least in some areas. Round cross-sections are also possible, at least in part. The metal part can also be a metal sheet, a cable, a part of a machine, such as a piston, bolt, flap, etc. The present method is therefore not limited to connecting parts. One result of the method, a local adaptation of the surface material of a metal part without changing other areas of the surface, is relevant for many different metal parts.

On the metal part, connection areas can be provided for non-positive connections on the one hand. These can be connection terminals, for example sleeves, lugs, cable lugs, holes with or without threads, bolts, etc., on which elements can be pressed in, pressed on, pressed, screwed, riveted, clamped, plugged in or otherwise connected by pressure. These areas can also be called bearing areas, screw-on areas, etc., depending on the type of connection.

Also, connection areas may be provided for welded connections. These may be areas on the surface of the metal part and/or separate connection terminals such as tabs, bolts, sleeves, cable lugs, etc. The surface of the metal part can be prepared for the welded connections. For example, it can be roughened, such as ribs, knobs, grooves, or otherwise have roughened surface structures. The surface can also be smoothed, in particular brushed, ground and/or polished. And/or the surface can be cleaned. For a connection, the metal part may also have a recess in the area of the welded joint.

A further aspect of the present method comprises providing a foil. The foil, which will later be at least partially joined to the metal part, may be a metal foil. This may, for example, have a thickness of 1 µm, 3 µm, 10 µm, 30 µm or 100 µm.

This coating thickness can also be achieved by the selective laser coating, whereby this can be realised by welding a foil onto the metal part. It should be noted that the thickness of the foil used does not have to correspond directly to the thickness of the coating. Rather, depending on the setting of the laser beam, the final coating can be thinner or thicker than the original foil. If the coating is thinner than the foil used, some of the foil material will be vaporised during the coating method. If the coating thickness is greater than the thickness of the foil, the foil is shrunk in a longitudinal direction by the thermal effect of the laser beam, but the volume of the foil material is the same or less. It follows that the volume of the laser-applied coating is constant compared to the volume of the original foil.

The thickness of the foil may be adapted to the particular connection. For example, for a purely chemical protective effect of the surface, a thin coating in the range of a few micrometres, in particular between 5 µm and 20 µm, may be sufficient. On the other hand, for a mechanical function, for example when the surface has to absorb a static and/or dynamic force, for example as a contact surface of a sonotrode for ultrasonic welding, a thicker coating in the range of 30 to 100 µm can be advantageous. This avoids damaging the coating and exposing the underlying material. Also, the thickness of the coating may be adapted to the material of the foil used.

The metal foil may be formed from metal materials such as tin, nickel, copper, aluminium, silver or gold or alloys thereof. The metal material of the foil may be adapted to the metal material of the metal part. In particular, the metal material of the foil can match the material of the metal part. Advantageously, the foil is formed from a different metal material than the metal part. In this way, the mechanical, electrical and/or chemical properties of the surface of the metal part in the area of the coating may be different from those at the uncoated areas of the surface of the metal part.

It is also possible that the foil is formed of two or more layers of different metal materials arranged on top of each other. These metal layers may already be materially bonded to one another, at least in certain areas, or pressed or laminated onto one another in a friction-locked manner, or merely laid one on top of the other.

In an advantageous embodiment, the metal material of the foil is made of a more ductile material than the metal part itself. It therefore has a lower hardness than the metal material of the metal. The hardness of the material can be determined by means of the Martens method DIN EN ISO 14577, the Rockwell method DIN EN ISO 6508-1, the Brinell method EN ISO 6506-1 to EN ISO 6506-4 and/or other methods.

This has the particular advantage with force connections that they can make contact over a larger area. This is because the ductile surface deforms when force is applied. In particular, unevenness of the contacting surfaces of the metal part on the one hand and the element to be contacted on the other hand can be compensated. It can thus be avoided that contact is only achieved at areas protruding from the contact surfaces of the metal part and the element to be contacted. The contact over a larger area reduces the electrical contact resistance between the metal part and the element to be contacted.

It is also possible that the metal material of the coating is selected according to its chemical properties, in particular the redox potential. Thus, a bimetallic contact part can be made from the first metal material of the metal part on the one hand and the metal material of the coating on the other hand. In particular, the metal material of the coating may be adapted to the material of the element to be contacted. In particular, these may be substantially the same. By adapting the two metal materials, contact corrosion between a contact part of a first material and an element to be contacted of a second, different metal material can be avoided by means of a coating arranged between these two in the connected state.

For the present method, the foil is positioned in a bearing area on one side of the metal part on the metal part. After applying, the foil may rest on the metal part substantially without air inclusions, at least in parts of the bearing area. It is also possible that the foil initially contacts the metal part only to a small extent. The surface of the metal part is substantially flat in the bearing area and possibly in areas near the bearing area. It is also possible that the surface is curved, in particular convex and/or concave. The shape of the surface can be adapted to the element to be contacted. The surface in the area of the contact area can also be structured in another way, such as knobbed, ribbed, grooved, etc. In particular, elevations can serve to fix the foil in the placed position. An essentially plain surface is also possible. This facilitates readjustment of the position of the foil in the applied state.

The bearing area can extend to at least one limiting edge of the respective surface of the metal part and in this way be limited by the metal part itself. However, the bearing area can also lie completely within the respective surface of the metal part and have a distance from the edges bounding the surface in all directions.

The foil can define the bearing area by its size. Thus, the foil can rest exactly in the bearing area on the metal part and the area it occupies can correspond exactly to the bearing area. It is also possible for the foil to be larger than the bearing area and for only a portion of the foil to be in contact with the metal part.

When the foil is applied on the metal part, it can be placed in a bearing area. The placement can therefore determine the position of the foil on the metal part. The placement can be done without a special bond between the foil and the metal part in this step. The foil can therefore simply lie loosely on the metal part. The foil can also be pressed on, for example by means of a roller, a carrier moving towards the metal part, a stamp, etc. When the foil is applied by pressing, it can already adhere at least partially to the metal part, in particular a frictional and/or material connection can be formed at an interface, so that its position is at least temporarily fixed to a certain degree. A frictional connection can preferably be achieved in this step.

If a surface structuring is arranged in the area of the bearing area on the metal part, this structuring can contribute to further fixing, regardless of whether the foil has only been applied or otherwise, e.g. with pressure. For example, positioning nubs can be provided on the metal part in the bearing area. In particular on the side areas of the bearing area and/or the foil, especially in the case of a rectangular foil in the area of the corners of the foil. An optimised form fit between the foil and the surface, in particular during pressing on, can also be achieved by a relief-like surface structure in the bearing area.

Preferably, the foil is already cut to a shape before being placed on the metal part. This shape can correspond to the shape of the bearing area, but the foil can also be larger than the bearing area, or it can be smaller. A foil that is larger than the bearing area can compensate for positioning errors. Furthermore, the foil can also be forged by means of the laser beam at the edge of the generated coating in such a way that the coating is separated from exposed, unforged foil. Small shifts of the foil relative to the correct position do not result in parts of the bearing area not being covered by the foil. It is also possible not to cut the foil at all, but to place a small area of a relatively large piece of foil on the metal part and not allow the rest of the foil to come into contact with the metal part. On the other hand, it may be desired that the foil does not protrude beyond the bearing area. In this case, a foil with a smaller surface area than the bearing area is advantageous, as even positioning errors of the foil do not necessarily cause it to protrude beyond the bearing area.

The foil can be held by means of a vacuum gripper, a carrier roller, by hand, by means of a mechanical gripping tool or other holding possibilities before it is applied. Further, the foil may be attached using another welding method, such as resistance welding. It can be advantageous to place the foil directly on the metal part by means of the respective holding possibility. In this way, a reproducible positioning relative to the metal part can be achieved. For example, foils that have already been cut to size can be held on a roller and rolled onto the metal part.

In contrast to conventional laser coat welding, the material to be applied is provided in the form of the foil. The foil is applied locally and selectively. The metal part can be coated precisely, e.g. on a screw-on surface, while the rest of the metal part can remain uncoated. The transition between the coating and the uncoated area can be locally sharp without the need for a transition zone.

The method of applying may take place in an environment set for this purpose. For example, the temperature of the environment may be set. Depending on the material of the foil, the foil may have a softer consistency (measured according to one of the measurement methods mentioned above) due to a temperature, in particular an increased temperature compared to the ambient temperature that would normally be expected, compared to the consistency at ambient temperature. In particular, the temperature of the foil may be adjusted close to its melting point. A softer consistency can favour an adaptation of the foil to the surface of the metal part and, in particular, achieve a more extensive contact between the foil and the metal part directly after application. It is also possible that the temperature is reduced compared to the ambient temperature and thus provides for a harder foil. This can prevent the foil from tearing.

It is possible to apply a second foil or more foils (immediately or after a time has elapsed) to the metal part after the first foil has been applied. These can overlap each other, in particular completely overlap, but can also be positioned in completely separate bearing areas.

In a further step of the present method, the foil placed on the metal part is irradiated with a laser at least in parts of the bearing area. By means of the laser, the foil can be locally heated and possibly melted, in particular remelted. The material of the metal part lying under the foil can also be heated in this step and, if necessary, locally melted, in particular remelted. In this way, a material bond between the foil and the metal part can be achieved. The foil can be welded or soldered onto the metal part by the laser.

The laser can be a pulsed laser, in particular an ultrashort pulse laser, or a continuous wave laser with a continuous laser beam. Such lasers are known and are already used to expose coated surfaces as described above, for example after coating a metal part. Through the proposed use of an already existing laser, the present method can be easily integrated into existing production chains. In particular, the laser can be an Nd:YAG, a $CO_2$, a diode or a disk laser. Other laser types are possible.

The laser enables a spatially precisely defined connection between the foil and the metal part. By moving the laser over at least part of the bearing area, a material bond can be achieved over the desired part of the bearing area. The area within which the foil is welded onto the metal part is hereinafter referred to as the welding surface. This may comprise parts of the bearing area. In particular, the welding surface may substantially coincide with the bearing area. The material bond between the foil and the metal part can be achieved in parts of the welding surface. However, a substantially gapless material bond between the foil and the metal part can also be achieved over the entire welding surface.

Since the laser cannot heat the entire welding surface at once, it is proposed to move the laser along a welding pattern across the welding surface. This welding pattern can be traced along a line at least partially filling the welding surface in a continuous motion. It is also possible to traverse a grid step by step with the laser and to weld the foil spot by spot at each step at a different grid point of the grid onto the metal part.

It is advantageous if areas in the centre of the welding surface are welded by laser first and only then areas further and further out are welded. This prevents the foil from contracting or expanding on one side. Air pockets between the foil and the metal part are also avoided. The contour of the welding surface can also be welded first, at least in spots. Only then can the laser move further and further inwards from the outside. In this way, shrinkage of the foil is avoided as far as possible. It is also advantageous if the areas are arranged on the welding surface in such a way that the areas heated by the laser beam (laser spot) partially overlap each other. In this way, it is avoided that non-welded areas remain within the welding surface and an essentially full-surface material bond between the foil and the metal part can be achieved.

Due to the effect of the laser, the foil can contract or expand during welding. To counteract this, the order of the grid positions for welding can be adjusted as mentioned above. Thus, outer grid positions can be welded first. Also, for this reason, the foil can be dimensioned larger or smaller than the welding surface and/or than the supporting surface. This way, the welding surface remains covered even if the foil contracts a little or the foil does not expand far beyond the limits of the bearing area when it expands. The foil can also first be fixed in a coarse grid of welding spots and then welded finer and finer so that deformations of the foil remain only very local.

If the area of the welding surface is smaller than the size of the applied foil, excess foil parts can be removed by the laser. For this purpose, the edge of the foil can be moved away with the laser beam and the foil can thus be cut off. A higher laser power can be used for cutting, also the same laser power can be used as for welding. For cutting the foil by laser, it is advantageous if the foil is not in direct contact with the metal part in the area of the cut. This allows the foil to be separated locally, in particular to evaporate.

In order to achieve a seamless transition between the foil and the uncoated surface of the metal part, it can be advantageous to first roll on the foil or otherwise bring it close to the metal part after cutting. Afterwards, the pressed-on edge area of the welding surface can be scanned again with the laser and the possibly remaining, not yet welded foil parts can be remelted onto the metal part. Also, these steps (pressing on) can be omitted and simply all remaining protruding foil parts can be vaporised by the laser.

It has been recognised that the foil can either be welded onto the metal part or vaporised under laser action, depending on the contact with the metal part. If there is contact between the two, welding occurs, otherwise the foil is separated. This can be used to achieve a combined cut-out and full-area welding of the foil. For this purpose, the foil can contact the metal part only in the area of the desired welding surface. It can protrude beyond this welding surface, but without contacting the metal part. As the laser now moves along the foil including its edge areas, the foil is welded on in the areas that make contact with the metal part.

In the areas where there is a gap between the foil and the metal part, it evaporates. The welding surface is automatically welded and cleanly cut out in one step. Also, directly after placement, especially while the holding tool is still holding the foil in position, the cut around the contour of the foil can be made by the laser. Afterwards, the foil can be remelted by the laser.

The described procedure of combined welding and cutting out is especially helpful if the foil is larger than the welding surface or has not yet been cut into shape at all. For example, the foil can be unrolled from a large reservoir, such as an endless belt, and pressed onto the metal part in the contact area, especially without being cut out first. The cut foil can also be only slightly larger than the welding surface, for example 10%, 20%, 30%, 40% or 50%, in order to compensate for positioning errors and/or possible contraction of the foil under laser action. The foil can also be dimensioned smaller, for example 10%, 20%, 30% smaller than the welding surface, in order to compensate for any expansion that may occur.

The laser can now first weld the foil in a bearing area where the foil is in contact with the metal part. Afterwards, the laser can cut the contour of the foil where it no longer lies directly on the metal part. Any remaining excess foil can be vaporised, for example. The steps 1-(cutting out the contour) and 2-(melting the foil into the welding surface) can also be exchanged. The result is a selective coating in a combined step of welding and cutting. There is no need to cut the foil before placing and/or welding. Also, positioning difficulties of the foil relative to the metal part are eliminated, since the cut determines the foil area.

It can be advantageous to apply the foil to the metal part under a certain composition of the surrounding gas and/or to method it by means of a laser. For example, there can be a negative pressure in the vicinity of the metal part and the foil, which creates an almost gas-free vacuum. In this way, air inclusions are largely avoided. It is also possible to apply the foil under a protective gas atmosphere, such as nitrogen, argon, argon-helium, etc. In this way, chemical changes of the foil, especially oxidation, can be avoided. The shielding gas can temporarily surround parts of the assembly, in particular parts of the foil, or the foil and/or the metal part can be enveloped in a shielding gas atmosphere throughout the entire method of the procedure. In particular, a protective gas atmosphere can be helpful during laser welding to avoid a change in the material properties, especially oxidation.

Often the aim of the local coating is to prepare the metal part for a joint. This can be force connections and here, in particular, screw connections are common. For force connections in general, the coated surface can be arranged in the area of a connection area of the connection, in which the metal part and the part to be connected are in contact with each other. In particular, the connection area can be located completely within the welding surface. In this case, the element to be joined only comes into contact with the foil coating, not with the uncoated material of the metal part.

The present method allows the metal part to be coated around a recess, in particular around a hole. This is possible by placing the foil on the metal part in the bearing area as described above, which now comprises one or more recesses, for example holes. In the welding step, the laser is moved over the welding surface and melts it over. In this case, the welding surface does not enclose the recesses (but the bearing area already encloses the recesses). After the welding method is finished, the recesses can be exposed by means of the laser. This is done by tracing the edges with the laser. The foil evaporates in these areas and can thus be removed cleanly in the area of the recesses. Of course, the foil only has to be cut by the laser in the area of the edge of the recesses and can then be removed. It is also possible that the laser first scans the edge areas of the recesses outside the recesses, i.e. in areas where the metal part is still under the foil, and thus achieves a weld in the edge area. Only then can the rest of the welding surface be joined. After that, the recesses can be cut out. Such a sequence of areas formed by the laser can be integrated into a welding pattern described above.

For force connections, but also for other connections, one or more recesses can often be provided in the metal part as mentioned above. In particular, holes are conceivable.

For the method, the intensity of the laser, i.e. its power, is of crucial importance. If the intensity is too high, the foil will be damaged or warped. If the intensity is too low, a reliable material bond will not be achieved. The power of the laser must be adapted to the density of the layer as well as to the foil material and the metal part material, the temperature of the method, etc. The power of the laser must also be adapted to the thickness of the foil and the metal part material.

If two or more foils are to be welded on the metal part, they can first be positioned on the metal part during the lay-up step. Afterwards, the foils can be welded by the laser respectively, or, if they overlap, together in one step in this overlapping area, as described above. It is also possible to place and weld one or more first foils first. Afterwards, in a second or even further pass, one or more further foils can be placed on the already coated metal part and then welded. The method can be repeated with any number of further foil layers. Such two-step or multi-step welding may be advantageous to achieve a multi-layer coating. For example, contacting between two metal materials of particularly strongly differing redox potentials can be made possible by inserting a compensating intermediate layer. The contact areas and/or welding surfaces of different foils successively welded onto the metal part can be spatially completely separated from each other, i.e. have no overlap. It is also possible for them to overlap. In particular, a foil applied later can completely enclose the previously applied foil. Also, the first applied foil may completely enclose the area occupied by the later applied layer.

Another aspect relates to a metal part produced according to the described method. Such a metal part is formed from a first metal material and is coated on an area of its surface with a second metal material. The remainder of the surface of the metal part, away from the coated area, may be uncoated and has no residue and/or traces of removal of a metal coating in the uncoated areas.

The metal part produced by the present method may be a connector part. Such a connection part may, on the one hand, have an area for making a welded connection. This area is preferably not coated and has not been freed from a coating. In other words, it was not coated in the manufacturing method of the connection part and its coating was removed again. In addition, a connection terminal for a force connection is provided on the connection part. This can be a screw connection in particular, but also a clamp, press or riveted connection or others. Thus, a hole with or without a thread is provided in the connecting part in the area where the screw connection is to be made. In the area of the hole, the surface of the connecting part is coated according to the present method. The coating can be applied on both sides of the connector, which are connected by the hole. It is also possible that the coating is applied to only one of the two sides. The size of the coating on the respective side may depend on the size of the element to be contacted. Thus, the element to be contacted can be arranged with its entire contact surface exclusively on the coated area (welding surface). It is also possible that only parts of the contact surface are coated on the metal part.

BRIEF DESCRIPTION OF THE DRAWINGS

In the following, the subject matter is explained in more detail with reference to drawings showing embodiments. The drawings show.

DETAILED DESCRIPTION OF SPECIFIC EMBODIMENTS

Figure 1A:
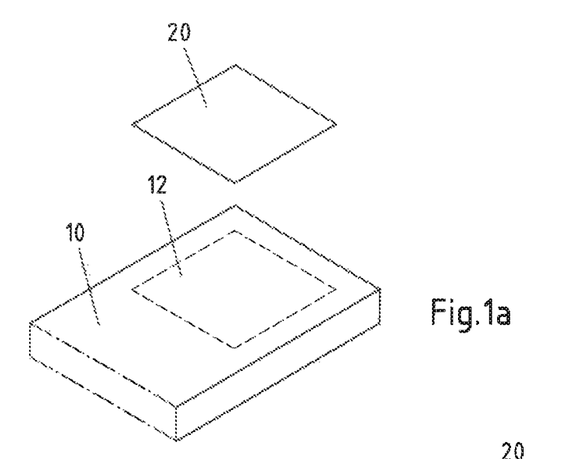
FIG. 1a-c an embodiment of the present method.
Figure 1B:
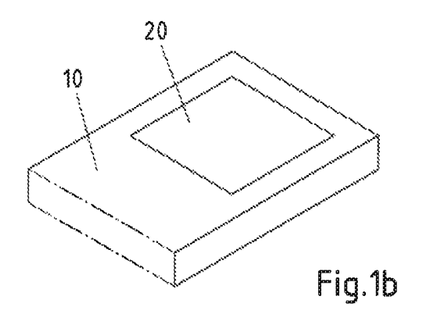
Figure 1C:
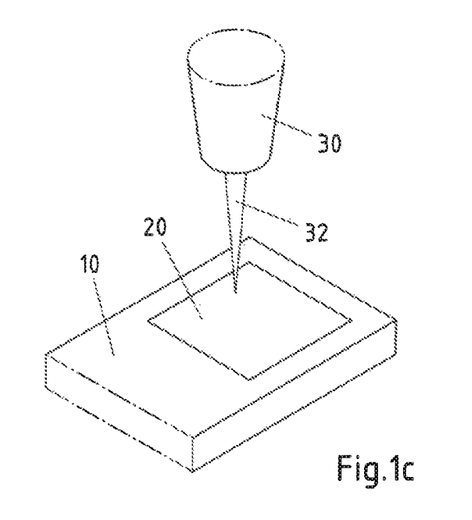

FIGS. 1a-c show the main features of the coating method in question. First, a metal part and a metal foil 20 are provided, see FIG. 1a. A bearing area 12 can already be defined on the metal part 20 onto which the foil will be positioned.

In FIG. 1b, the foil 20 has been placed on the metal part 10 in the area of the bearing area 12. The foil 20 can be placed loosely, as described above, or it can already be pressed onto the metal part with a certain force. The size of the foil and the bearing area 12 do not have to correspond, so the foil 20 can be either larger or smaller than the bearing area 12.

FIG. 1c shows the irradiation of a laser beam 32 from a laser 30 onto the foil 20. The laser 30 can melt around the foil 20 and thus achieve a material bond between the foil 20 and the metal part 10 in the area of laser action. A material bond is achieved in at least parts of the bearing area 12 in a welding surface. When reference is made in this document to a laser, this can mean both the laser beam or the apparatus of the laser.

Figure 2:
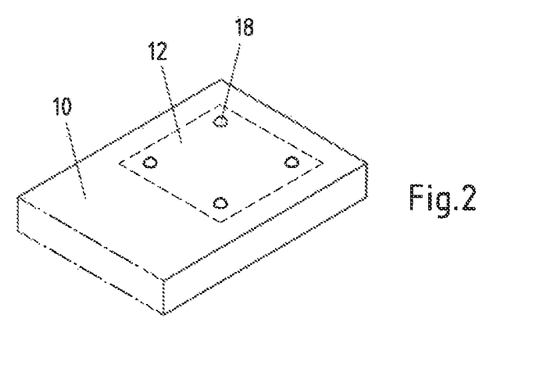
FIG. 2 an embodiment of a structured bearing area.

For improved fixation of the foil 20 to the metal part 10 after application, the surface of the metal part 10 may be structured in the area of the bearing area 12. In particular, protrusions 18 may be provided in the bearing area 12. In particular, positioning nubs 18 may be provided at the edge areas of the bearing area 12 as shown in FIG. 2. In the case of a rectangular foil 20, the protrusions 18 may be located in the area of the corners of the foil 20 and/or the bearing area 12.

Figure 3A:
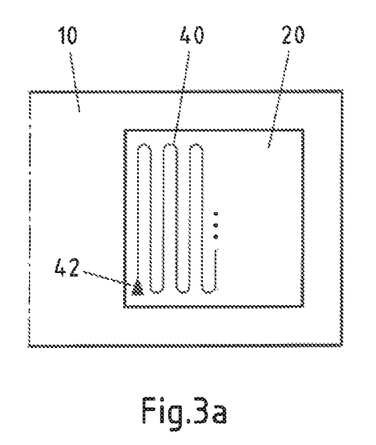
FIG. 3a-c embodiments of various continuous welding patterns.
Figure 3B:
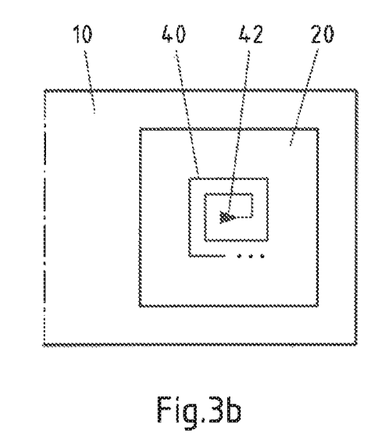
Figure 3C:
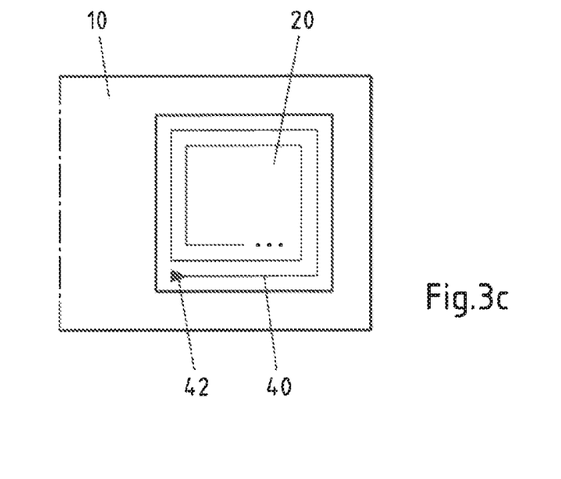

Since the laser 30 can only heat and remelt the foil 20 locally, the laser 30 must move over the welding surface for the two-dimensional connection between the foil 20 and the metal part 10. This is done in a welding pattern 40. FIG. 3 shows some exemplary and advantageous welding patterns. Here, the laser 30 can be moved in a continuous motion over the foil 20. FIG. 3a shows a meandering welding pattern 40 that extends from a starting point 42 in parallel paths over the foil 20. This pattern has the advantage that many foil shapes can be traversed uniformly in one step without switching off and/or repositioning the laser.

Alternatively, as shown in FIG. 3b, the laser 30 can move outward from a central position 42 of the bearing area 12 or sealing area in paths substantially concentric with the starting point 42. This has the advantage that the foil 20 does not move towards one side of the bearing area 12. In addition, the risk of air entrapment is low.

Alternatively, as shown in FIG. 3c, the laser 30 can start from the edge of the applied foil 20 at a starting point 42 and work its way from there towards the centre of the sealing surface. This can have the advantage that the edge area of the foil 20 is already firmly connected to the metal part 10 and the foil 20 is thus no longer movable, in particular cannot contract or expand. A covering of the welding surface by the foil 20 is thus ensured.

Figure 4A:
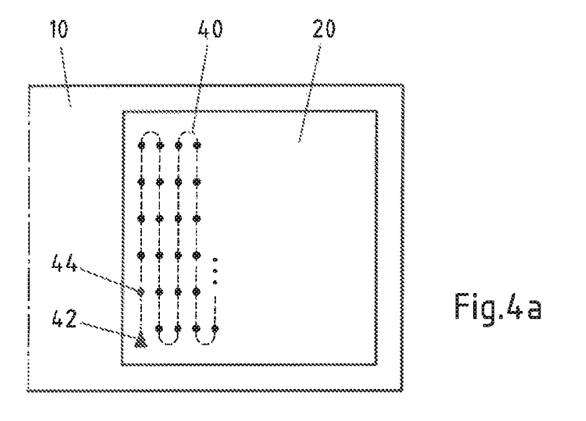
FIG. 4a-c embodiments of various gridded welding patterns.
Figure 4B:
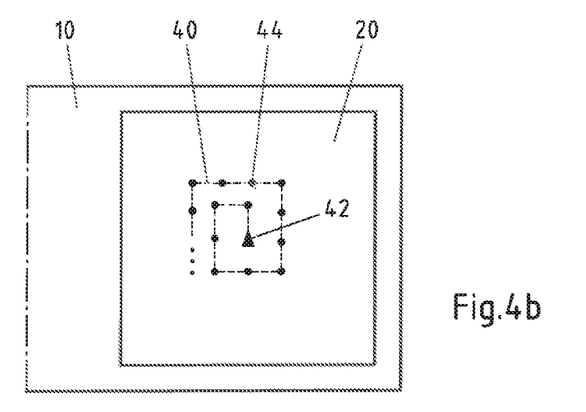
Figure 4C:
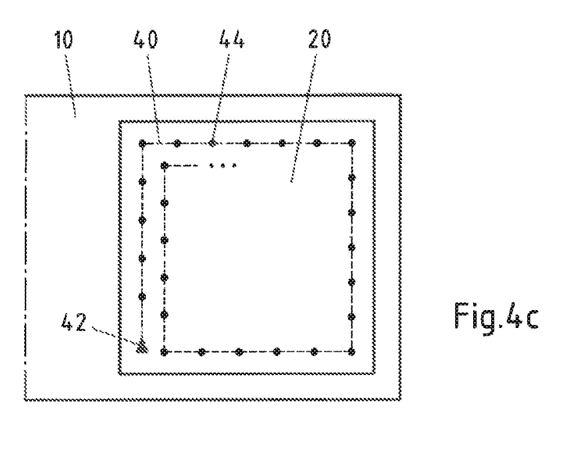

Instead of or in combination with a continuous movement of the laser 30 along a welding pattern 40, it is also possible to have the laser 30 act on the foil 20 at one point 44 at a time in a grid 40. In this case, the laser 30 does not move during the emission of light, but between individual irradiation events. The foil 20 is remelted at each point. The laser nevertheless scans a pattern 40, albeit point by point. FIG. 4 a-c show the patterns 40 from FIG. 3 a-c with a laser action point by point.

Figure 5A:
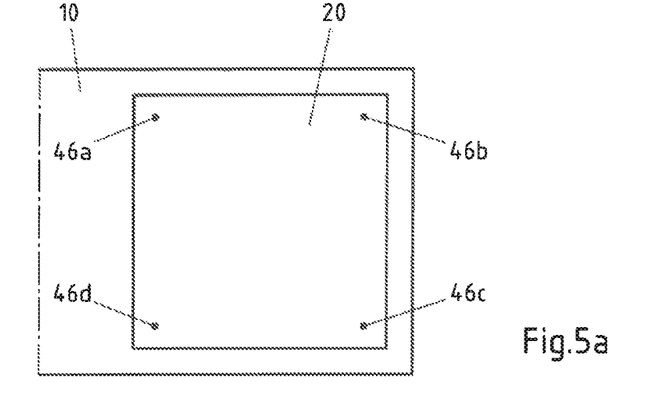
FIG. 5a-c embodiments of various gridded welding patterns with edge fixation.

In order to reduce any displacement, contraction, expansion or otherwise change in the position or shape of the foil 20 due to the action of the laser beam 32, the foil 20 may be welded over at individual positioning points 46 prior to the full area fusion. Afterwards, the full-surface connection between the foil 20 and the metal part 10 can be completed by means of the laser 30. FIG. 5a shows an example of four positioning points 46 a-d at the corners of a rectangular bearing area 12. Depending on the shape of the welding surface, more or fewer and differently positioned positioning points 46 can be set. Positioning points 46 in central locations of the welding surface are also conceivable. A procedure not shown is also possible, in which first a coarse grid of welding points is remelted and then increasingly finer grids follow. Also possible is a first, essentially evenly distributed initial grid, which is then followed by a full-surface sweep, for example according to one of the patterns in FIG. 3a-c.

Figure 5B:
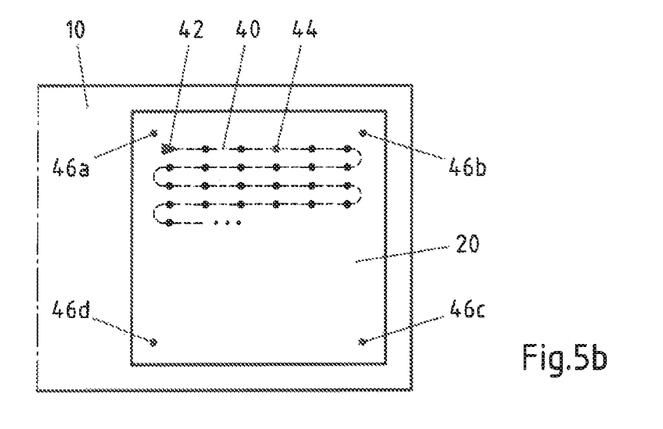
Figure 5C:
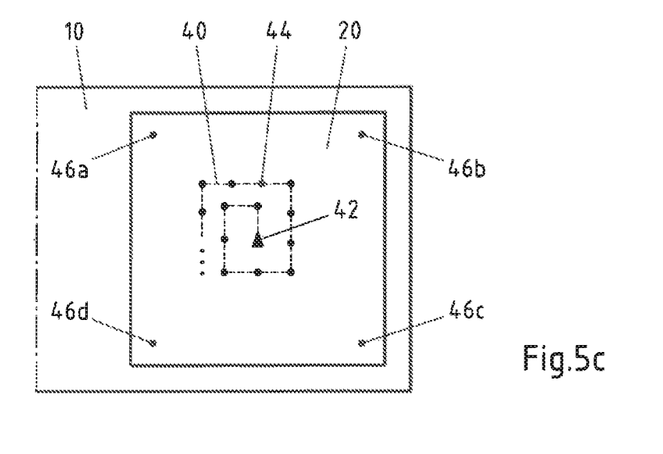

In FIG. 5b, a subsequent full-area re-melting of the foil 20 on the metal part 10 is shown, after application of the positioning points 46. This can run in a meandering pattern as in FIG. 5b, but can also run essentially concentrically from the outside to the inside as in FIGS. 3c and 4c, from the inside to the outside as in FIG. 5c, or in a different way. The pattern 40 of FIG. 5c has the advantage that air pockets are avoided by the outwardly spreading remelting and at the same time a deformation of the foil by the outwardly located positioning points 46 is avoided.

Figure 6A:
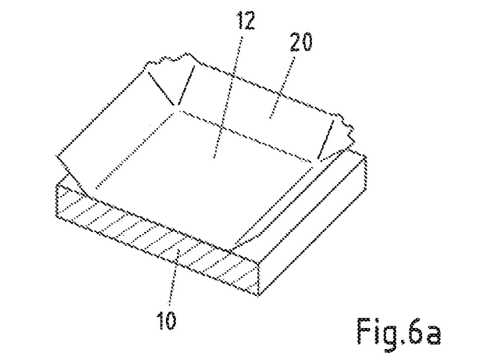
FIG. 6a,b an embodiment of a combined remelting and cut-out.
Figure 6B:
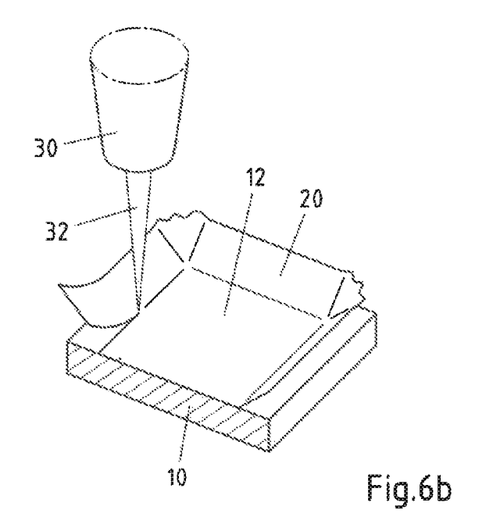

FIG. 6 shows the combined remelting and cutting of the foil 20 by the laser 30. Where the foil 20 has contact with the metal part 10 in the bearing area 12, the laser 30 has a remelting effect and welds the foil 20 and metal part 10. However, where the foil 20 does not rest directly on the metal part 10, the laser 30 cuts the foil 20. Thus, an appropriately positioned foil 20 can be remelted and materially bonded to the metal part 10 both in the central bearing area 12 or in the welding surface enclosed by it. In contrast, the laser 30 has a cutting effect in the edge areas of the bearing area 12 where the foil 20 is not in contact. The foil 20 is thus both remelted and cut out in one pass through the laser 30. The sequence between cutting the contour and remelting the foil in the welding surface can be reversed.

FIG. 7 shows a connection part produced by the present method. This is formed from a metal material and comprises, on the one hand, a welding terminal 16, which can have a surface prepared for the welding method, which can be in particular smooth or, as shown in FIG. 7a, roughened, in particular provided with grooves. Furthermore, the connection part has a hole 14. This can be provided, for example, for a screw connection; a riveted connection or the like is also possible. The area with hole 14 is thus intended for a force connection.

Figure 7A:
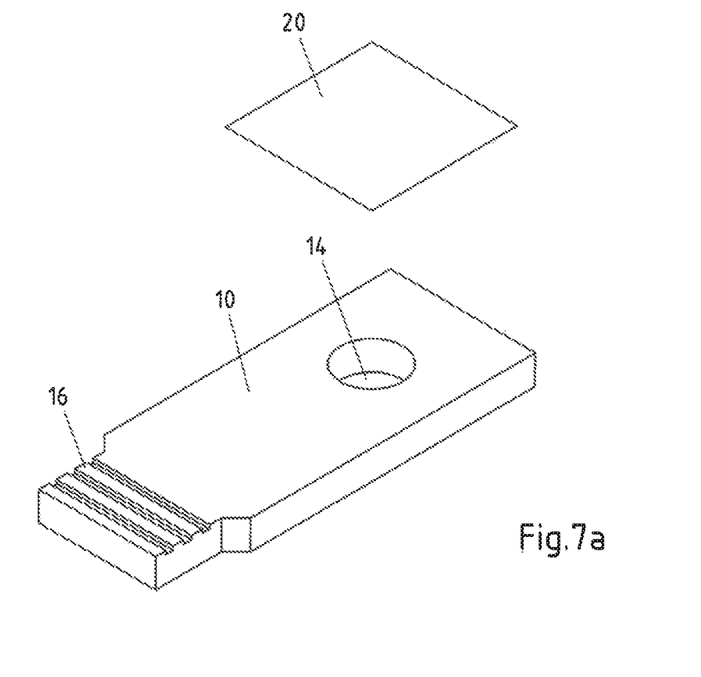
FIG. 7a-e an embodiment of a connection part manufactured according to the present method.
Figure 7B:
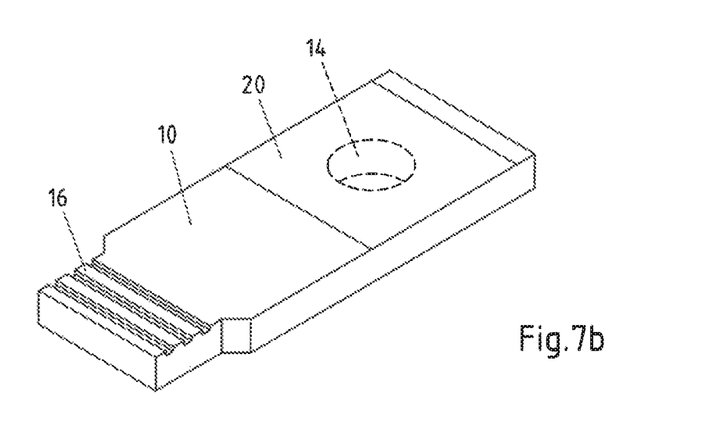
Figure 7C:
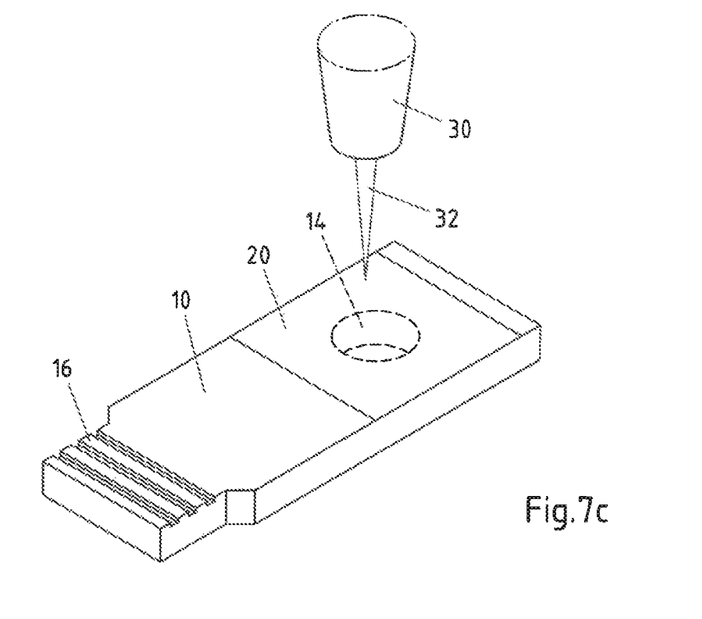
Figure 7D:
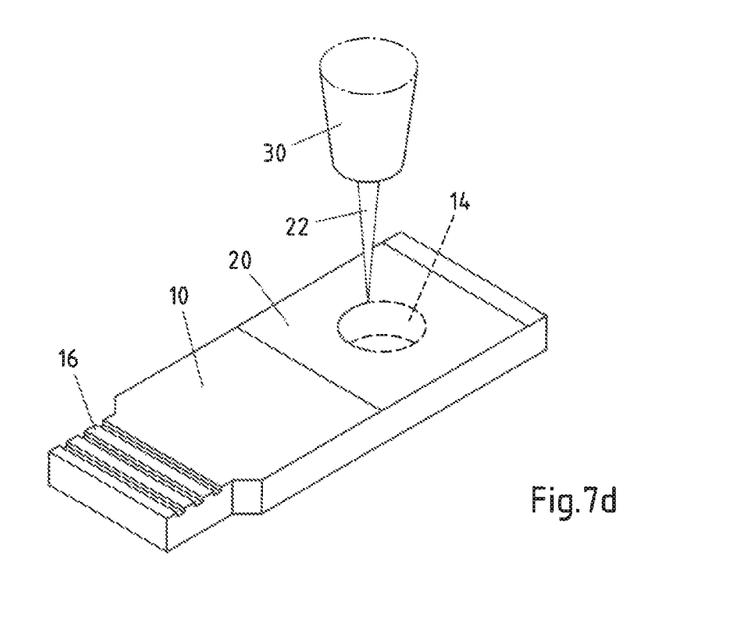
Figure 7E:
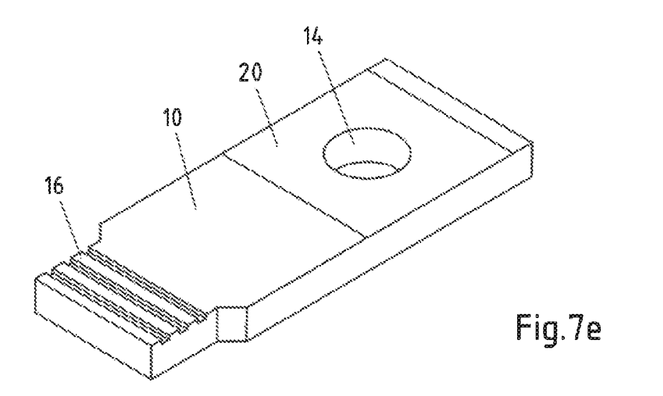

According to the present method, a foil 20 is now placed on the perforated area of the later force connection, see FIG. 7a,b. As shown in FIG. 7c, the foil 20 is now joined by means of a laser 30 in the contact area and/or the welding surface. The hole is excluded from the welding pattern 40 (not shown). In a further step (FIG. 7d), the hole is now exposed by the same or another laser 30. For this purpose, the foil is cut by the laser in the area of the contour of the hole, in particular vaporised. FIG. 7e shows the finished connection part. On the one hand, it is prepared for a welded connection and has a completely clean surface. On the other hand, it is prepared for a force connection due to the foil coating. For example, the coated surface can be more ductile than the rest of the surface of the metal part.

Figure 8:
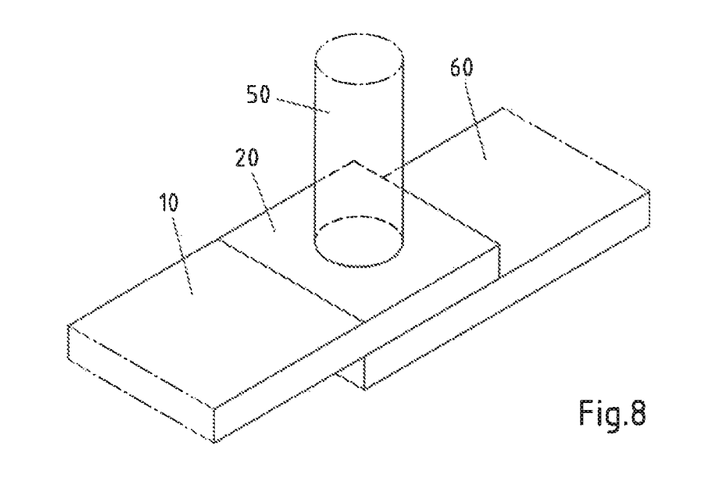
FIG. 8 an embodiments of ultrasonic welding of a metal part coated by the present method.

A coating by means of foil 20 can also be used for other purposes than a better contact. For example, a surface that is softer in areas (lower hardness according to one of the measurement methods mentioned above) than the rest of the surface of the metal part is helpful for ultrasonic welding. If the sonotrode 50 of an ultrasonic device touches down on a metal surface that is too hard, high abrasion can result from the collision of two hard materials and the welding times must be reduced. Here it is helpful, as shown in FIG. 8, to coat the contact surface of the sonotrode on a first metal part 10 with a foil 20. When ultrasonically welding to a second metal part 60, the sonotrode now contacts a coated area of the first metal part 10 and can apply energy to it for longer times without causing too much abrasion.

LIST OF REFERENCE SIGNS

10 Metal part
12 Bearing area
14 Hole
18 Elevations
20 Foil
30 Laser
32 Laser beam
40 Welding pattern
42 Starting point
44 Grid point
46 Positioning points
50 Sonotrode
60 Metal part

What is claimed is:

1. A method of coating metal parts comprising:
providing a metal part from a first metal material,
applying a foil made of a second metal material on the metal part in a bearing area,
irradiating the foil applied on the metal part in at least a portion of the bearing area with a laser, wherein the bearing area of the metal part comprises a hole and at least partially a screw on area,
materially bonding the applied foil with the metal part in the bearing area, wherein the foil is at least partially remelted in a welding surface by the laser,
evaporating the foil by the laser in the area of the hole.

2. The method according to claim 1, wherein the welding surface constitutes a part of the bearing area or the welding surface substantially fills the entire bearing area.

3. The method according to claim 1, wherein the laser is an ultrashort pulse laser.

4. The method according to claim 1, wherein recesses of the metal part in the bearing area are cut out by the laser and/or that the outer contour of the foil is cut out by the laser.

5. The method according to claim 1, wherein the metal part is a cable lug.

6. The method according to claim 1, wherein the foil is heated close to the melting point during application.

7. The method according to claim 1, wherein in the bearing area there is arranged a structuring.

8. The method according to claim 1, wherein the bearing area is at least partially traversed by the laser in a grid of spatially regularly distributed welding positions and the foil is welded and/or reformed at the respective welding positions in an essentially punctiform area and/or the bearing area is continuously traversed by the laser in at least partially a continuous line and the foil is welded and/or formed along the line.

9. The method according to claim 1, wherein the foil is formed of nickel, tin, silver, gold or alloys thereof.

10. The method according to claim 1, wherein the metal part is formed from copper, a copper alloy, aluminium or an aluminium alloy.

11. The method according to claim 1, wherein at least one second foil is applied to the metal part at least in a second welding surface by means of a laser, wherein the first welding surface and the second welding surface do not overlap or at least partially overlap.

12. The method according to claim 1, wherein a shielding gas is applied to at least a part of the bearing area immediately before, immediately after and/or during at least one of A) the application of the foil or B) the irradiation by the laser.

13. A method of coating metal parts comprising:
providing a metal part from a first metal material,
applying a foil made of a second metal material on the metal part in a bearing area,
irradiating the foil applied on the metal part in at least a portion of the bearing area with a laser, wherein the bearing area of the metal part comprises a hole and at least partially a screw on area,
materially bonding the applied foil with the metal part in the bearing area,
evaporating the foil by the laser in the area of the hole,
wherein at least one second foil is applied to the metal part in a second welding surface by means of a laser, wherein the first welding surface and the second welding surface do not overlap or at least partially overlap.

14. The method according to claim 13, wherein the first welding surface constitutes a part of the bearing area or the first welding surface substantially fills the entire bearing area.

15. The method according to claim 13, wherein the laser is an ultrashort pulse laser.

16. The method according to claim 13, wherein recesses of the metal part in the bearing area are cut out by the laser and/or that the outer contour of the foil is cut out by the laser.

17. The method according to claim 13, wherein the metal part is a cable lug.

18. The method according to claim 13, wherein the foil is heated close to the melting point during application.

19. The method according to claim 13, wherein the bearing area is at least partially traversed by the laser in a grid of spatially regularly distributed welding positions and the foil is welded and/or reformed at the respective welding positions in an essentially punctiform area and/or the bearing area is continuously traversed by the laser in at least partially a continuous line and the foil is welded and/or formed along the line.

20. The method according to claim 13, wherein a shielding gas is applied to at least a part of the bearing area immediately before, immediately after and/or during at least one of A) the application of the foil B) the irradiation by the laser.

* * * * *